G. E. COOPER.
BAKING OVEN.
APPLICATION FILED NOV. 3, 1920.

1,383,256.

Patented June 28, 1921.

INVENTOR.
George E. Cooper.

UNITED STATES PATENT OFFICE.

GEORGE E. COOPER, OF NASHVILLE, TENNESSEE.

BAKING-OVEN.

1,383,256.   Specification of Letters Patent.   Patented June 28, 1921.

Application filed November 3, 1920. Serial No. 421,487.

*To all whom it may concern:*

Be it known that I, GEORGE E. COOPER, a citizen of the United States, and a resident of Nashville, in the county of Davidson and State of Tennessee, have invented certain new and useful Improvements in Baking-Ovens, of which the following, taken in connection with the accompanying drawings, is a specification.

This invention relates to the improvement in ovens, and particularly to that class of baking-ovens adapted to be placed over the top burners of kerosene, gasolene or gas stoves.

An object of the present invention is to improve and simplify the construction of ovens, and to provide an efficient and inexpensive oven capable of using the heat from a minimum quantity of fuel in the most effective manner.

Another object is to so construct the interior of the oven that the heat will be distributed uniformly throughout the interior, thereby insuring perfect baking.

A further object is to provide means to prevent liquids or solids from the food being baked from dropping on the burner and accidentally extinguishing the flame.

With these and other objects in view, the invention consists in the construction and novel combination of parts hereinafter fully described, illustrated in the accompanying drawings, and pointed out in the appended claims; it being understood that various changes in the form, proportion, size and minor details of construction, within the scope of the claims, may be resorted to without departing from the spirit or sacrificing any of the advantages of the invention.

In the drawings:—

Like numbers of reference designate like parts throughout the several views.

Figure 1:
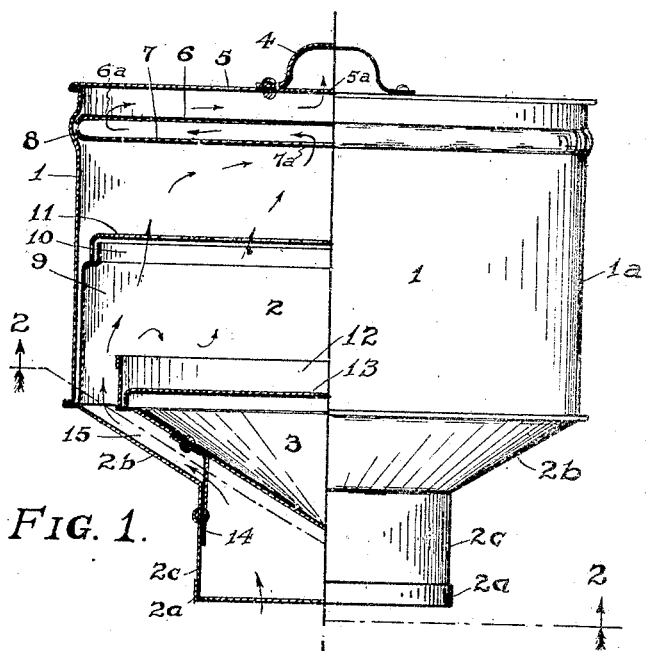
Figure 1 is a composite view of the oven constructed in accordance with this invention, the right half being a vertical elevation, and the left half, a vertical section taken on a radial plane through the center of the oven.
Figure 2:
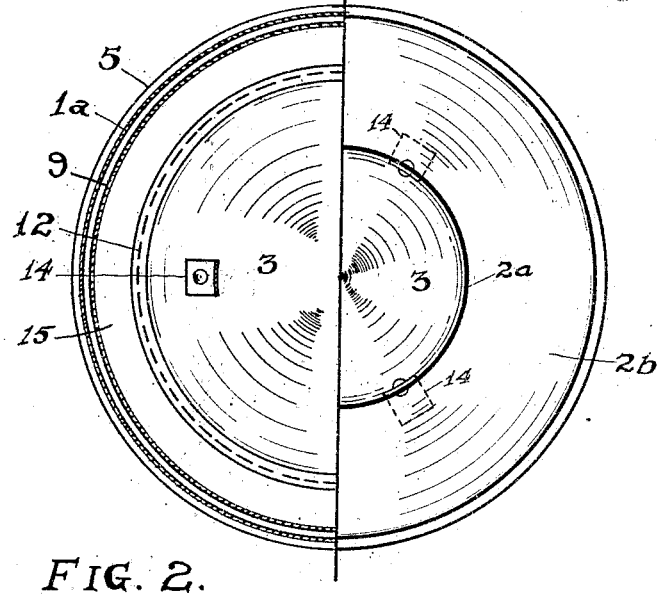
Fig. 2 is a composite view of the oven, the right half being a bottom plan view, and the left half, a sectional plan view taken on the line 2—2, Fig. 1.
Figure 3:
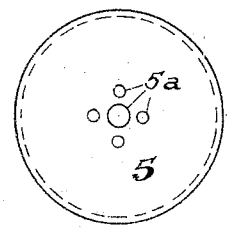
Fig. 3 is a top plan view (on a reduced scale) of the oven top 5, the handle 4 being omitted.
Figure 4:
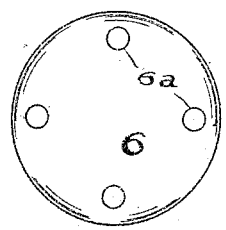
Fig. 4 is a plan view (on a reduced scale) of the baffle plate 6.
Figure 5:
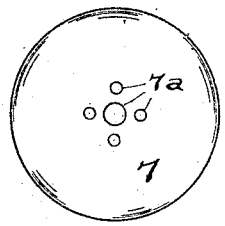
Fig. 5 is a similar view of the baffle plate 7.

In the accompanying drawings in which is illustrated the preferred embodiment of the invention, the oven consists essentially of an outer cylindrical casing 1, an inner supporting casing 2 and a cone-shaped deflector plate 3.

The oven is preferably constructed of heavy sheet metal the component parts of which are joined or secured to each other in a manner commonly used in the tinner's art.

The outer casing 1 comprises the vertical cylindrical member $1^a$ which is secured to a flat cover plate 5 provided with a handle 4 fastened near its center. The inner supporting casing 2 is made up of the vertical cylindrical portion $2^c$ whose bottom edge is formed up into a reinforcing band $2^a$. This portion $2^c$ is of sufficient diameter to encompass a burner on a stove of the usual size. A cylindrical vertical wall 9, of slightly less diameter than that of the member $1^a$ and of approximately one-half the height, is positioned above the portion $2^c$. An intermediate downwardly tapered annular flange $2^b$ serves to join the wall 9 with the portion $2^c$.

The cylindrical casing $1^a$ is adapted to fit loosely over the outside of the vertical wall 9 and rest on a ledge formed by the juncture of the edges of members 9 and $2^b$. The upper end of the wall 9 is formed inward to provide a constricted collar or neck which furnishes a support for the downwardly flanged edge of a perforated shelf 11 and also retains the shelf in position while permitting its easy removal when not desired.

The upper casing 1 is provided with two baffle plates 6 and 7 which are positioned slightly below the cover 5 and spaced apart from each other being retained in position by having their edges pressed into a circumferential groove 8 provided in the casing wall $1^a$. The cover 5 and baffle plate 7 have one or more openings spaced in or adjacent their centers while baffle plate 6 has a plurality of openings positioned adjacent its periphery.

The inverted cone-shaped heat deflector plate 3 is so positioned within the inner casing 2 that its wall will parallel that of the tapered annular flange $2^b$ and provide a passageway 15 therebetween. This deflector plate serves to deflect the heat from the burner upwardly and outwardly through the passageway 15 so that said heat will enter the oven near the outer wall of the latter. The upper edge of the deflector plate is flared outwardly and secured to the lower edge of a vertical deflector wall 12, which wall serves to direct the ascending heat into the upper part of the oven space and also serves to prevent liquids which may escape from the cooking utensil on the shelf 13 from descending through the passageway onto the burner below. This shelf, preferably of sheet metal, is provided with a downwardly extending flange adapted to rest on a horizontal rim formed near the juncture of the base or edge of the plate 3 with the vertical wall 12.

A plurality of brackets or feet 14 are secured by riveting or otherwise to the deflector plate 3 and the vertical wall 2° and serve to support the deflector plate in a central horizontal position within the casing 2 and in spaced relation therefrom.

By referring to Fig. 1, it will be apparent that the heat which rises from the burner (not shown) below the burner opening in the portion 2° of the oven will traverse a path such as is indicated by the arrows, being deflected by the cone-shaped deflector plate 3 upwardly through the circumferential passageway 15. From here it proceeds vertically upward past the circular wall 12, circulating over the shelf 13 and passing through the openings in the perforated shelf 11, entering the openings 7ª in the baffle plate 7. The heat is then directed radially outward through the space between baffle plates 6 and 7, upwardly through the openings 6ª in baffle plate 6, returning to the center of the oven in the space between plate 6 and the cover 5, finally escaping upwardly through the openings 5ª in the cover 5 to the exterior of the oven.

This tortuous path within the oven retains the heat therein sufficiently long to be most effective in uniformly baking the food on the shelves 11 and 13 while allowing enough circulation to carry off any gases formed during the baking process.

Further, the inverted position of the deflector plate 3 prevents the direct heat from the burner from reaching the shelf 13 and eliminates the danger of burning any food placed on said shelf.

Having described the invention, what is claimed is:—

1. An oven of the class described, including an outer cylindrical casing provided with a top, baffle plates adjacent said top and provided with suitably spaced apertures, an inner supporting cylindrical casing arranged to fit loosely over the said outer casing, an inverted cone-shaped deflector plate within the inner casing, supporting means secured to said inner casing and said deflector plate adapted to support said deflector plate in spaced relation to the sides of the inner casing, a perforated shelf removably secured to the upper edge of said inner casing, an imperforate shelf positioned on the rim of the deflector plate, and a handle fastened to the top of the outer casing.

2. An oven of the class described, including an inner casing comprising an upper cylindrical member having a perforated top, an intermediate downwardly tapered annular flange, a lower cylindrical base member, provided in its bottom with a burner opening, an inverted cone-shaped deflector plate positioned adjacent said annular flange and forming a passageway for the heat from the burner to the inner casing, an outer casing arranged to fit loosely over the upper cylindrical member, and means including baffle plates adjacent the top of the outer casing for retarding the escape of the heat from within the upper casing to the atmosphere.

3. In a baking oven, the combination of an outer casing and an inner casing, means associated with the inner casing whereby heat is deflected radially upward and is caused to enter the inner casing adjacent its vertical wall, means within the upper casing whereby the heat is directed upwardly near the center of said casing, then horizontally and radially outward to the outer wall of the casing, then horizontally and radially inward to the center, then upward and out through the top of the casing.

4. In a baking oven, the combination of an upper outer casing with an inner lower casing, said upper casing fitting loosely over said lower casing, the bottom of the lower casing being provided with a burner opening, means within and secured to the lower casing including a deflector plate adapted to deflect heat from the said burner opening outwardly and upwardly through a passageway into the upper casing, and means adjacent the top of the upper casing adapted to deflect the heat from the center of the upper casing radially outward to the walls thereof, then inwardly to the center, and upward through the top of the casing.

5. The combination of an outer cylindrical casing, an inner cylindrical casing, a deflector plate within the inner casing positioned so as to form a passageway therebetween, a collar formed on the upper edge of the inner casing, a perforated shelf provided with a downwardly extending flange, said flange adapted to fit over said collar and be supported thereby, and an imperforate shelf below said perforated shelf and supported on a horizontal annular rim of the deflector plate.

Signed at Nashville in the county of Davidson and State of Tennessee this 29 day of Oct. A. D. 1920.

GEORGE E. COOPER.